United States Patent
Liu

(10) Patent No.: US 9,881,359 B2
(45) Date of Patent: *Jan. 30, 2018

(54) VIDEO COMMUNICATION METHOD AND SYSTEM IN INSTANT COMMUNICATION

(71) Applicant: Alibaba Group Holding Limited, Grand Cayman (KY)

(72) Inventor: Shuyan Liu, Hangzhou (CN)

(73) Assignee: Alibaba Group Holding Limited, Cayman Islands (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/157,854

(22) Filed: May 18, 2016

(65) Prior Publication Data

US 2016/0260201 A1    Sep. 8, 2016

Related U.S. Application Data

(63) Continuation of application No. 14/617,621, filed on Feb. 9, 2015, now Pat. No. 9,369,669.

(30) Foreign Application Priority Data

Feb. 10, 2014 (CN) .......................... 2014 1 0046708

(51) Int. Cl.
  *G06T 5/00* (2006.01)
  *H04N 7/15* (2006.01)
  *H04N 7/14* (2006.01)

(52) U.S. Cl.
  CPC ............. *G06T 5/002* (2013.01); *H04N 7/147* (2013.01); *H04N 7/15* (2013.01); *G06T 2207/10016* (2013.01); *G06T 2207/30201* (2013.01)

(58) Field of Classification Search
  CPC ............ G06T 5/002; G06T 5/003; H04N 7/15
  (Continued)

(56) References Cited

U.S. PATENT DOCUMENTS 6,067,399 A    5/2000  Berger
7,020,344 B2   3/2006  Edgar
(Continued)

FOREIGN PATENT DOCUMENTS

WO   WO2012094042    7/2012

OTHER PUBLICATIONS

Office action for U.S. Appl. No. 14/617,621, dated Dec. 3, 2015, Liu, "Video Communication Method and System in Instant Communication", 11 pages.

(Continued)

*Primary Examiner* — Gerald Gauthier
(74) *Attorney, Agent, or Firm* — Lee & Hayes, PLLC

(57) ABSTRACT

A video communication method and system implementing video communication between a first user and a second user in instant communication are disclosed. The method includes: receiving a request for video communication; determining whether to perform a blurred processing on a video image of the first user; and if affirmative, performing the blurred processing on the video image of the first user such that a blurred video image of the first user is displayed on a video dialog window of the second user. Using the present disclosure, convenient online interactions via video communication may be achieved while ensuring that respective privacies of users are not overly exposed.

20 Claims, 7 Drawing Sheets

(58) Field of Classification Search
USPC .. 348/14.08, 14.13, 14.01, 14.02, 14.07, 47, 348/211.99, 239; 382/118, 173; 709/231, 204; 375/240.08; 711/154; 726/28, 30; 345/632; 455/414.1, 566; 725/32
See application file for complete search history.

(56) References Cited

U.S. PATENT DOCUMENTS

| | | | |
|---|---|---|---|
| 7,120,289 | B2 | 10/2006 | Baumberg |
| 7,227,567 | B1* | 6/2007 | Beck ................. H04N 7/147 348/14.01 |
| 7,657,171 | B2 | 2/2010 | Sundstrom |
| 7,783,075 | B2 | 8/2010 | Zhang et al. |
| 8,395,694 | B2 | 3/2013 | Kim |
| 8,488,896 | B2 | 7/2013 | Shi et al. |
| 8,629,894 | B2* | 1/2014 | Lee .................. H04M 1/72572 348/14.01 |
| 8,640,257 | B1* | 1/2014 | Sherrets ............. G06F 21/6245 707/732 |
| 8,647,206 | B1 | 2/2014 | Gottlieb |
| 8,947,491 | B2 | 2/2015 | Rosenberg |
| 9,070,230 | B2 | 6/2015 | Wilensky et al. |
| 9,083,850 | B1 | 7/2015 | Higgs |
| 9,105,088 | B1* | 8/2015 | Petrie ................... G06T 5/002 |
| 9,369,669 | B2* | 6/2016 | Liu ......................... H04N 7/15 |
| 9,800,833 | B2* | 10/2017 | Lu ........................... H04N 7/15 |
| 2002/0132610 | A1* | 9/2002 | Chaplin ............. H04M 1/72544 455/414.1 |
| 2005/0140781 | A1* | 6/2005 | Chi ..................... H04N 19/176 348/14.13 |
| 2006/0050141 | A1 | 3/2006 | Yoshimura |
| 2007/0286520 | A1 | 12/2007 | Zhang et al. |
| 2008/0028092 | A1* | 1/2008 | Shen ................... H04N 7/147 709/231 |
| 2008/0077953 | A1* | 3/2008 | Fernandez ............. H04N 7/15 725/32 |
| 2008/0120374 | A1 | 5/2008 | Kawa et al. |
| 2008/0234007 | A1* | 9/2008 | Lee .................. H04M 1/72544 455/566 |
| 2008/0242352 | A1 | 10/2008 | Koshijima et al. |
| 2008/0259154 | A1 | 10/2008 | Garrison et al. |
| 2008/0291261 | A1* | 11/2008 | Park ...................... H04N 7/147 348/14.02 |
| 2009/0041311 | A1 | 2/2009 | Hundley |
| 2009/0086013 | A1* | 4/2009 | Thapa ..................... H04N 7/15 348/14.08 |
| 2009/0300122 | A1 | 12/2009 | Freer |
| 2010/0027888 | A1* | 2/2010 | Katano ................. G06T 19/006 382/173 |
| 2011/0149014 | A1 | 6/2011 | Chung |
| 2011/0153738 | A1* | 6/2011 | Bedingfield ......... H04N 5/2354 709/204 |
| 2012/0050323 | A1* | 3/2012 | Baron, Jr. ................ H04N 7/15 345/632 |
| 2012/0147121 | A1* | 6/2012 | Erb ..................... H04N 5/23219 348/14.01 |
| 2012/0287222 | A1* | 11/2012 | Liu ..................... H04N 5/23238 348/14.07 |
| 2013/0083155 | A1 | 4/2013 | Andresen |
| 2013/0227225 | A1* | 8/2013 | Oliver .................. G06F 21/316 711/154 |
| 2014/0055551 | A1* | 2/2014 | Hong ................... H04N 7/147 348/14.01 |
| 2014/0160250 | A1* | 6/2014 | Pomerantz ......... H04N 5/23229 348/47 |
| 2014/0307116 | A1* | 10/2014 | Zhang ................ H04N 5/23203 348/211.99 |
| 2014/0376785 | A1* | 12/2014 | Bathiche ............ G06K 9/00335 382/118 |
| 2015/0186660 | A1* | 7/2015 | Sherrets ............... G06F 21/604 726/30 |
| 2015/0229882 | A1* | 8/2015 | Liu ......................... H04N 7/15 348/14.08 |
| 2015/0234891 | A1 | 8/2015 | Liu |
| 2016/0260201 | A1* | 9/2016 | Liu ......................... H04N 7/15 |

OTHER PUBLICATIONS

Office action for U.S. Appl. No. 14/617,621, dated Mar. 18, 2016, Liu, "Video Communication Method and System in Instant Communication", 6 pages.
PCT Search Report and Written Opinion dated May 14, 2015 for PCT Application No. PCT/US15/15020, 10 Pages.
The Extended European Search Report dated Aug. 3, 2017 for European patent application No. 15745822.5, 9 pages.

* cited by examiner

VIDEO COMMUNICATION METHOD AND SYSTEM IN INSTANT COMMUNICATION

CROSS REFERENCE TO RELATED PATENT APPLICATION

This application is a continuation of U.S. application Ser. No. 14/617,621 filed on Feb. 9, 2015 which claims foreign priority to Chinese Patent Application No. 201410046708.0 filed on Feb. 10, 2014, entitled "Video Communication Method and System in Instant Communication", which is hereby incorporated by reference in its entirety.

TECHNICAL FIELD

The present disclosure relates to the technological field of instant communication, and more particularly to methods and systems of video communication in instant communication.

BACKGROUND

With the development of communication technology, people can communicate with one another anytime and anywhere through mobile terminals. Initially, means of communication conducted via terminal devices mainly include: short messaging, multimedia messaging and telephoning. However, their costs are relatively high to users. Along with the development and advancement of technologies such as 3G (3rd-generation, third generation mobile communication technology), WiFi (wireless fidelity), etc., the reduction of network flow charges and the rapid spread of smart mobile terminals, a number of products are developed in the field of mobile terminal communications, which include mobile terminal communication products (for example, instant communication products or other products such as games having an instant communication function).

Unlike the communication methods of short message and mobile phone, the mobile terminal communication products can organize users into a virtual social network, in which the users can communicate with each other, such as sending text/voice messages, pictures and files, etc., and a message can reach the other party in real time provided that he/she is online. This type of virtual social network makes communication between people more convenient and also reduces the communication cost.

However, problems such as inadequate interaction more or less exist in text and voice communications. Therefore, in order for face-to-face communications between two communicating parties in a better manner, existing technologies offer video communication technology. Through this technology, communicating parties may see a video image of the other party on screens of respective terminal devices, and may further use voice chat to talk to each other during a process of communication. This type of video communication technology is commonly used in a communication process between friends who are well-acquainted with each other. However, if two users have not developed a friendship, the users may not want the other to see how they really look for fear that the other may judge him/her by their appearance, or simply because they have concerns about their own appearance. In other cases, even though two users are friends with each other, one of the users may refuse video communication as he/she may not want to over-expose his/her true image during a video communication process.

Therefore, a technical problem that is urgently needed to be solved is: how to satisfy the need of a user to conduct communication via video communication to improve interactivity while avoiding overly exposing his/her true image in certain specific application scenarios, thereby improving a usage rate of the video communication technology and more fully demonstrating functionalities of the video communication.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

The present disclosure provides a method and a system of video communication in an instant communication process, which achieve convenient online communication between unfamiliar users via video communication while ensuring that respective privacies are not overly exposed.

The present disclosure provides the following solutions.

A video communication method used for conducting video communication between a first user and a second user during instant communication, comprising:

receiving a request for video communication;

determining whether to perform a blurred processing on a video image of the first user; and if affirmative, performing the blurred processing on the video image of the first user such that a blurred video image of the first user is displayed on a video dialog window of the second user.

A video communication method used for conducting video communication between a first user and a second user during instant communication, comprising:

sending a request for video communication to a client of the first user from a client of the second user;

receiving a video image of the first user by the client of the second user, the video image of the first user having been undergoing a blurred processing by the client of the first user; and displaying a blurred video image of the first user in a video dialog window of the second user.

A video communication system used for conducting video communication between a first user and a second user during instant communication, comprising:

a request receiving unit used for receiving a request for video communication;

a determination unit used for determining whether to perform a blurred processing on a video image of the first user; and a blurred processing unit used for performing the blurred processing on the video image of the first user when a determination result of the determination unit is affirmative, such that a blurred video image of the first user is displayed on a video dialog window of the second user.

A video communication system used for conducting video communication between a first user and a second user during instant communication, comprising:

a request sending unit used for sending a request for video communication to a client of the first user from a client of the second user;

a video image receiving unit used for receiving a video image of the first user by the client of the second user, the video image of the first user having been undergoing a blurred processing by the client of the first user; and a display unit used for displaying a blurred video image of the first user in a video dialog window of the second user.

According to the embodiments of the present disclosure, the present disclosure discloses the following technical effects:

Through the embodiments of the present disclosure, a blurred operation may be performed for a video image of an opposite communicating party when two users conduct video communication. As such, convenient online interactions via video communication may be achieved while ensuring that respective privacies of users are not overly exposed.

Any products that implement the present disclosure do not need to achieve all the above advantages at the same time.

BRIEF DESCRIPTION OF THE DRAWINGS

In order to more clearly describe technical solutions of the present disclosure or the existing technologies, accompanying drawings needed to be used by the embodiments are briefly explained herein. The drawings are merely some embodiments of the present disclosure. One of ordinary skill in the art is able to obtain other drawings based on these drawings without paying creative efforts.

DETAILED DESCRIPTION

The technical solutions in the embodiments of the present disclosure will be described herein with the accompanying drawings in a clear and comprehensive manner. The described embodiments are only a part but not all of the embodiments of the present disclosure. The other embodiments that are obtained by one of ordinary skill in the art based on the embodiments of the present disclosure fall within the protective scope of the present disclosure.

In the embodiments of the present disclosure, in order to enable users to use video communication without worrying about over-exposure of their true images, video image of the users may undergo a blurring operation when the user conduct video communication there between. As such, an image of the other party seen by a user is blurred, and no excessive information is exposed to that user. Meanwhile, an audio device is usually activated during video communication, the users may chat with each other via an audio means. Therefore, communications can be easily realized. The embodiments of the present disclosure are described in detail hereinafter.

First Embodiment

Figure 1:
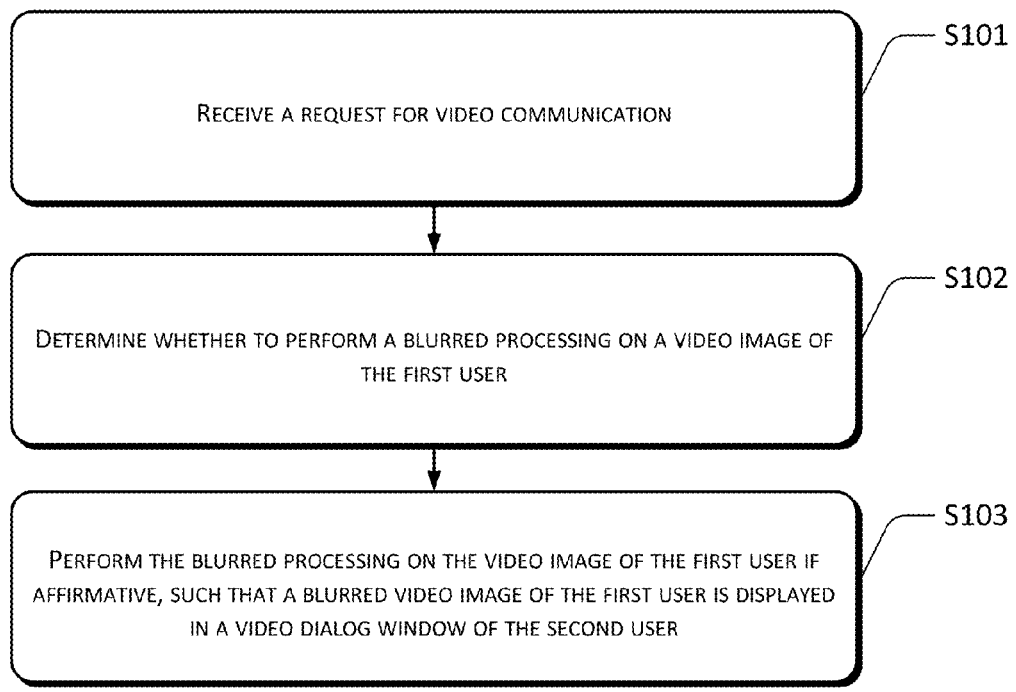
FIG. 1 is a flow chart illustrating a method in accordance with an embodiment of the present disclosure.

As shown in FIG. 1, this embodiment of the present disclosure provides a method of video communication in an instant communication process. The method is used for conducting video communication between a first user and a second user. More specifically, the method may include the following:

S101 receives a request for video communication.

S102 determines whether to perform a blurred processing on a video image of the first user.

S103 performs the blurred processing on the video image of the first user if affirmative, such that a blurred video image of the first user is displayed in a video dialog window of the second user.

It should be noted that a part or all of the method blocks in the first embodiment may be performed at a client of the first user or at a client of the second user. Alternatively, they may be performed by an instant communication server that provides a video communication service to the first user and the second user. Descriptions are given as follows in terms of different embodiments.

Second Embodiment

The second embodiment of the present disclosure provides a method of video communication in an instant communication process. The method is used for conducting video communication between a first user and a second user. In this second embodiment, each method block is performed at a client of the first user. More specifically, the method may include the following:

First block receives a request for video communication.

The request for video communication in this block may be initiated by the first user or the second user.

Second block determines whether to perform a blurred operation for a video image of the first user.

After receiving the request for video communication, a client of the first user determines whether to perform a blurred operation for a video image of the first user.

A number of determination methods exist, and determination criteria may be set by the first user or the client software. For example, one or a combination of the following determination criteria may be used for determining whether to perform a blurred operation for a video image of the first user:

A: whether the second user is in a first contact list;

B: whether the first user and the second user conduct video communication with each other for the first time;

C: whether the request for video communication includes an indicator instructing a blurred operation for the video image of the first user.

With respect to the determination criterion A, an examination is made as to whether the second user is included in a contact list of the first user (more specifically, a determination may further be made as to whether the second user is included in a buddy list of the first user). If affirmative, this indicates that two users have already known each other or have contacted each other before. In this case, a normal process of video communication may be used, i.e., activating an image capturing apparatus of a terminal device, sending captured video image information of the first user to the second user, and displaying received video image information that is sent from the second user in a video dialog window. If the second user is found to be not included in the contact list of the first user, this indicates that the users may not know each other. In this case, the first user may set this situation as a criterion for performing the blurred operation so as to avoid an excessive exposure of a true image thereof to a stranger.

With respect to the determination criterion B, a video communication record may be set up for the first user. When a user X conducts video communication with the first user, a video communication indicator is set up for the user X to indicate that the first user has conducted video communication with the user X. Based on the video communication record set up for the first user, a determination is made as to whether the first user and the second user conduct video communication for the first time. If affirmative, decision of performing the blurring operation for the video image of the first user is made.

With respect to the determination criterion C, an operation entry of whether to perform a blurring operation for a video image thereof may be provided to the first user. In a specific implementation, the operation entry may be another operation entry different from common video communication operation entries. For example, two buttons may be set up in a user interface at the client, one of which is used for initiating traditional video communication, and the other being used for initiating blurred video communication. If the first user wants to initiate a request for video communication, which is launched via an operation entry that initiates blurred video communication, this shows that the first user desires a video image thereof to go through a blurring operation.

Alternatively, the request for blurred video communication and a request for traditional video communication may share a same operation entry, only that an option of blurred communication is displayed to the user when the first user launches a request for video communication. If the first user chooses that option, this shows that the first user has launched a request for blurred communication. Otherwise, if the first user doesn't choose that option, then this shows that the first user has launched a request for normal video communication.

Alternatively, in a situation that the first user receives a request for video communication from the second user, an option of blurred video communication may be provided to the user at the client of the first user. Likewise, if the first user chooses that option, this shows that the first user has accepted the request for video communication and desires his video image to undergo a blurring operation. Otherwise, if the first user doesn't choose the option, this shows that no blurring operation is needed for the video image of the first user.

In addition, in a situation that the first user receives a request for video communication from the second user, if information associated with the request for video communication has included an indicator of a need of performing a blurring operation, a decision that the blurring operation is to be performed for the video image of the first user is made based directly on the indicator included in the information.

The aforementioned criteria may be used independently or may be used in combination. In a process where a combination of criteria is used, an order for applying the criteria may further be set up. For instance, the criterion A is first determined, and the criterion B is determined if the criterion A is satisfied. If the criterion B is satisfied, a determination is made that the blurring operation is to be performed for the video image of the first image. Specifically, a determination as to whether the second user exists in a contact list of the first user is first made. If affirmative, a determination is made as to whether the two users conduct video communication with each other for the first time. If affirmative, a determination is made that the blurring operation is to be performed for the video image of the first user. As another example, the criterion C is first determined, and if the criterion C is not satisfied, the criterion A is determined. If the criterion A is not satisfied, the criterion B is finally determined. In other words, a determination is made as to whether a request for video communication includes an indicator that is used for instructing a blurring operation for the video image of the first user. If included, a determination is then made as to whether the second user appears in the contact list of the first user. If affirmative, a determination is made whether the two users conduct video communication with each other for the first time. If affirmative, a decision is made that the blurring operation is to be performed for the video image of the first user.

It should be noted that the present disclosure is not limited to the foregoing criteria. One of ordinary skill in the art can design or perform a selection based on the need of a user or the design of an instant communication system. For instance, different criteria or different combinations of the criteria may be designed based on different perspectives such as user interactivity needs, user experience, etc.

Third block performs the blurring operation for the video image of the first user if affirmative, and sends a blurred video image of the first user to a client of the second user, such that the blurred video image of the first user is displayed in a video dialog window of the second user.

Figure 2:
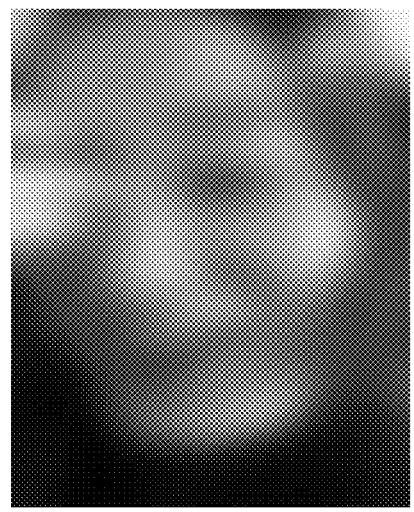
FIG. 2 is a schematic diagram illustrating a display interface in accordance with an embodiment of the present disclosure.

In response to receiving the request of video communication and determining that a blurring operation is needed to be performed for the video image of the first user, the client of the first user may directly perform the blurring operation on the video image of the first user, and then send (relay via a server or send in a point-to-point manner) a blurred video image to the client of the second user. As such, the video dialog window of the second user may directly display that blurred video image of the first user. For instance, in a specific embodiment, the video image of the first user shows a mosaic effect. A number of mosaic patterns may exist, and the present disclosure imposes no limitation thereon. FIG. 2 illustrates a mosaic having a mist pattern 200, i.e., making the video image to appear as if a screen of a terminal device is covered with a layer of mist. Therefore, the second user may vaguely sense the first user, and cannot see him/her clearly, thus preventing from exposing too much personal image information.

In an embodiment, as both parties of the communication need to transmit respective video images to the other party in the process of video communication, the client of the second user may also determine individually whether a blurring operation is needed to be performed for a video image of the second user in the above first situation. If needed, the blurring operation is performed directly for obtained captured video image of the second user, and a blurred video image is sent (relayed via a server or sent in a point-to-point manner) to the client of the first user. As such, the blurred video image of the second user may be displayed in a video dialog window of the first user.

In addition, in the first situation as mentioned above, a number of implementations of the blurring operation exist. For example, in one implementation, some primitive pixels may be extracted from each individual image frame in response to obtaining video image frames, and are deleted. As such, a blurred effect is achieved in a processed image frame due to relatively low in pixels. From the perspective of transmission costs, adopting this method reduces an amount of data that is transmitted. Alternatively, in another implementation, the blurring operation may be performed by applying a filtering function on a primitive video image. After performing the blurring operation for the video images, the parties of the communication may send messages to each other in a textual or audio format.

Figure 3:
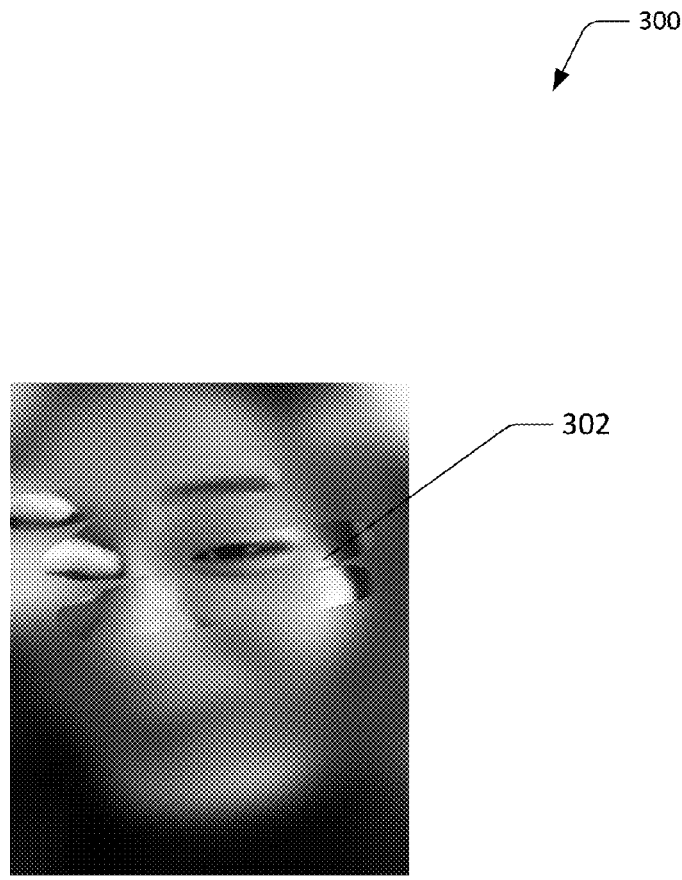
FIG. 3 is a schematic diagram illustrating another display interface in accordance with an embodiment of the present disclosure.

In order to further promote interactivity during interaction, the client of the first user may further determine a region of operation (for example, label 302 as shown in FIG. 3) corresponding to operation information in response to detecting an operation on the video image of the first user, and perform a blurring operation only on a portion of the video image that is outside the region of operation after obtaining the video image of the first user. In other words, when the user performs an operation (for example, performs a sliding operation on a touch screen of the terminal) on an image which has been blurred, this indicates that the user wants to see a video image of the other party clearly. Therefore, along with the operation of the user, a portion of the video image corresponding to a region of operation (for example, a region corresponding to a sliding operation, or a region corresponding to a block selection or clicking, etc.) is displayed clearly. Combined with the aforementioned "mist mosaic" displaying effect, this process is equivalent to modeling a process of "mist wiping", in which the entire process is similar to covering a terminal device with a layer of mist, and displaying clearly a region that is wiped as the user is wiping. The user can gradually see the video image of the other party of the communication clearly, and thus the vividness of the process is of operation is enhanced, as shown in FIG. 3.

In a specific implementation, the "wiping" process can be realized in many manners. For example, in the implementation that extracts some primitive pixels to achieve blurring, primitive pixels within an operation region may not be extracted and a high density of primitive pixels of the video image is maintained within the operation region. As such, this is equivalent to performing the blurring operation only on a part of the video image outside the operating region. On the other hand, if the blurring operation is realized by using predefined filtering function(s), input parameter values are no longer coordinates of the entire area where the video image is located, and are inputted to the filter function(s) after removing coordinates corresponding to the operation region. As such, this is equivalent to performing the blurring operation only on coordinates corresponding to the input parameters, and a region that is not processed can be displayed clearly. Additionally or alternatively, other methods of performing a blurring operation may be used in a real application, which are not described one by one herein.

With respect to the process of performing an operation on the video image of the first user, a user who performs the operation may be the first user or the second user.

If the first user needs to show his/her partial or whole video image clearly to the second user, then he/she may perform a related operation in a video image display child window in his/her video dialog window. For example, in an event that the terminal device is equipped with a touch screen, the user may directly perform a sliding operation in his/her video image display child window using a finger or a touch pen, etc. Alternatively, the user may use a mouse to perform a block selection in the video image display child window, etc.

For the client of the first user, this is equivalent to detecting that the first user operates on the video image of the first user. Under such circumstances, this is equivalent to the first user voluntarily showing his partial video image clearly to the second user. Thus, in response to determining the region of operation, the client of the first user directly performs a blurring operation only on a portion of the video image that is outside the region of operation, and then sends a partially blurred video image of the first user to the client of the second user. Accordingly, for the second user, what may be seen in the video dialog window thereof is the video image of the first user, a portion of which may be clear and another portion of which is still blurred.

In the second situation as mentioned above, if the second user wants to see part or all of the video image of the first user, the second user may perform an operation, such as a sliding operation or a block selection operation, etc., on the video image of the first user. In an embodiment, the client of the second user first detects this operation performed by the second user at this time. However, in this situation, the client of the second user may first transmit related information of this operation that is performed by the second user to the first user, and ask the first user whether to allow a display of a video image within an area region operated by the second user to the second user. If the first user gives an approval, the video image of the first user outside the region of operation is displayed to the second user. More specifically, the client of the first user may perform the following operations:

1) Receiving a notification from the client of the second user, the notification being used for indicating a detection of an operation performed by the second user on the video image of the first user and the notification including information associated with a region of operation;

2) Sending a query to the first user to ask the first user whether to allow a display of a video image within the region operated by the second user to the second user;

3) If an acceptance message indicating an approval is received from the first user, performing a blurring operation only on a portion of the video image of the first user that is outside the region of operation after obtaining the video image of the first user, and sending a partially blurred video image of the first user to the client of the second user, such that the client of the second user may display the partially blurred video image to the second user.

It should be noted that, regardless of whether the first user or the second user performs an operation on the video image of the first user, the operation may be conducted in the video dialog window of the client. Under normal circumstances, the video dialog window is divided into a first child window and a second child window. An area of the first child window is usually larger than that of the second child window. Under a default setting, the first child window is used for displaying a video image of the other party, and the second child window is used for displaying a video image of his/her own. However, content displayed in these two windows may be interchanged. For example, after performing a swap based on the default setting, the first child window may display the video image of his/her own, and the second child window may display the video image of the other party. In this embodiment of the present disclosure, for the first user, the first child window displays the video image of the second user, and the second child window displays the video image of the first user under a default setting. However, the area of the second child window is relatively small. Therefore, when the first user needs to perform an operation on the video image of the first user, he/she may first perform a swap operation which causes the video image of the first user to be displayed in the first child window, and then perform a specific operation in the first child window. For the second user, a first child window thereof displays the video image of the first user, and a second child window thereof displays the video image of the second user under a default setting. If the second user needs to perform an operation on the video image of the first user, he/she may directly perform the operation in the first video dialog window. If the second user needs to perform the operation on the video image of his/her own, he/she may also perform a swap operation first, which causes the video image of the second user to be displayed in the first child window, and then perform a specific operation in the first child window.

In addition, in this embodiment of the present disclosure, an operation is performed on the video image of the first user in an instance of video communication, information associated with a region of operation may be stored. In this way, the next time when the first user and the second user conduct video communication with each other in a blurred manner, the client of the first user may first determine whether information associated with a region of operation corresponding to the first user is stored. If affirmative, a blurring operation is directly performed only for an area of a video image that is outside the region of operation. A processed video image of the first user may then be to the client of the second user. In other words, when the two users conduct video communication with each other next time, what effect the second user sees in a video dialog window thereof is a video image of the first user, a portion of which is clear and a portion of which is blurred.

Furthermore, it should be noted that, in the process of blurred video communication, if a user operation on the video image of the first user is detected, a determination may further be made as to whether the second user appears in a contact list of the first user. If not, the second user may be added to the contact list of the first user. In an embodiment, prior to adding, the first user may be asked whether the second user is needed to be added into his/her contact list. Upon receiving an approval from the first user, the operation of adding is then conducted. That is to say, in the process of blurred video communication, if one party needs to add the other party as his/her friend, he/she may directly perform an operation on the video image of the other party. For example, in a situation that the terminal device is equipped with a touch screen, a user may directly perform an operation, such as a sliding operation or a clicking operation, etc., in a display region of the video image of the other party in the touch screen. Correspondingly, a backend database or a server end of a client may store triggering condition(s) for adding the other party as a friend. The triggering condition(s) is/are normally described using operation activity information of a user. For example, the operation activity information may be a simple operation type, such as sliding, clicking, or shaking a terminal device, etc. Alternatively, in order to avoid a false positive, more complicated triggering condition(s), such as a trajectory of sliding exceeding a certain length or a number of clicks to be two, etc., may be designed. In short, in response to detecting an operation of a current user performed on a video image, specific information associated with the operation activity may be first obtained. The specific operation activity information may be detected by devices such as a touch screen or other sensors of a terminal device. The client may read the detected information via a corresponding interface.

After obtaining the operation activity information, a determination may be made as to whether predefined condition(s) is/are satisfied, for example, whether an associated operation is a sliding operation within a video image display region, whether the operation is a clicking operation, etc. If the condition(s) is/are satisfied, a friendship between both communicating parties may be established. Specifically, a user ID of the other communicating party may be added to a buddy list of a present user. In an embodiment, the buddy list may need to be stored in the server. As such, a message may be sent to the server such that the server adds the user ID of the other communicating party to the buddy list of the present user. Furthermore, the friendship between the two users is reciprocal, and the server may add a user ID of the present user to a buddy list of the other communicating party.

Third Embodiment

The third embodiment of the present disclosure provides a method of video communication in an instant communication process. The method is used for conducting video communication between a first user and a second user. Each method block is performed by a client of the second user. Specifically, the method comprises the following:

First block receives a request for video communication.

Similarly, the request for video communication in this block may be initiated by the first user or the second user.

Second block determines whether to perform a blurring operation for a video image of the first user.

After the client of the second user receives the request of video communication, the client of the second user may determine whether a blurring operation is needed to be performed for the video image of the first user. A number of implementations of methods of determination exist, which may be the same as those determination methods described in the second embodiment. Implementations may be made by referencing thereto, and are not described in detail herein.

Third block performs the blurring operation for the video image of the first user if affirmative, and displays a blurred video image of the first user in a video dialog window of the second user.

In this approach, in response to receiving the video image of the first user, a client of the first user may directly send the video image to the client of the second user. Upon determining that a blurring operation is needed to be performed for the video image of the first user, the client of the second user performs the blurring operation on the video image of the first user, and displays a blurred video image of the first user in a video dialog window. In an embodiment, under this type of situation, after receiving his/her own video image, the second user may similarly send his/her own video image to the client of the first user directly. In an event that the client of the first user determines that a blurring operation is needed to be performed for the video image of the second user, the client of the first user may first perform the blurring operation on the video image of the second user, and then display a blurred video image of the second user to the first user in a video dialog window thereof.

In this implementation, various ways of processing when the client of the second user performs the blurring operation for the video image of the first user exist. Examples include the foregoing methods, such as extracting some primitive pixels or using filter function(s).

In addition, the effect of partial blurring may also be implemented if the video image of the first user is operated by a user in the process of blurred video communication. In a specific implementation, if the first user performs an operation on the video image of the first user, a process performed by the client of the second user may include the following:

1) receiving a notification from the client of the first user, where the notification is used for indicating that the first user has performed an operation on the video image of the first user and the notification may include information of an operation region of the first user;

2) when receiving the video image of the first user afterward, performing the blurring operation only on a portion of the video image that is outside the operation region, and displaying a partially blurred video image of the first user in the video dialog window.

If the second user performs an operation on the video image of the first user, the first user may be asked whether to allow a display of his/her video image that is partially clear to the second user first. Therefore, for the client of the second user, the following method blocks may be included:

1) in response to detecting an operation of the second user that is performed on the video image of the first user, determining an operation region, and sending information of the operation region to the client of the first user, such that the client of the first user sends a query to the first user to inquire whether the first user allows a display of a portion of the video image that is within the scope of the operation region performed by the second user to the second user;

2) after receiving a response message from the client of the first user and if information included in the response message indicates an approval, performing a partial blurring operation only on a portion of the video image that is outside the operation region after receiving the video image of the first user, and displaying a partially blurred video image in the video dialog window.

In this third embodiment, the information of the operation region operated by the first user may be stored. In this way, next time when the first user and the second user conduct blurred video communication with each other, the client of the second user may first query information of that operation region, and perform a partial blurring operation only on a portion of the video image of the first user that is outside the operation region, which is then displayed to the second user in the video dialog window.

Fourth Embodiment

The fourth embodiment provides a method of video communication in an instant communication process. The method is used for conducting video communication between a first user and a second user. Each method block is performed by a server. Specifically, the method may include the following:

First block receives a request for video communication.

The request of video communication in this block may be sent from the first user or the second user, and is sent from a client of the first user or a client of the second user to the server.

Second block determines whether to perform a blurring operation for a video image of the first user.

After the server receives the request of video communication, of the server may determine whether a blurring operation is needed to be performed for the video image of the first user. A number of implementations of methods of determination exist, which may be the same as those determination methods described in the second embodiment. For example, a determination may first be made as to whether the second user appears in a contact list of the first user. If not, a determination is made that the blurring operation is to be performed for the video image of the first user. Alternatively, if the two users conduct video communication with each other for the first time, a determination is made that the blurring operation is to be performed for the video image of the first user. In another alternative, if the request for video communication includes an indicator for blurred video communication, a determination is made that the blurring operation is to be performed for the video image of the first user.

Alternatively, if a request for blurred video communication is received from the client of the first user after receiving the request for video communication, a determination is made that the blurring operation is to be performed for the video image of the first user.

If affirmative, third block performs the blurring operation for the video image of the first user after receiving the video image of the first user, and sends a blurred video image of the first user to the client of the second user, so that the blurred video image of the first user is displayed in a video dialog window of the second user.

That is to say, under this approach, after obtaining the video image of the first user, the client of the first user may directly send the video image to the server. Upon determining that a blurring operation is needed to be performed for the video image of the first user, the server performs the blurring operation on the video image of the first user, and forwards a processed video image to the client of the second user, such that the client of the second user may display on the blurred video image of the first user in the video dialog window.

In an embodiment, in this situation, a process performed by the server for the second user is the same as that performed by the server with respect to the first user, and is not repeatedly described in detail herein.

In this implementation, a number of processing methods exist for the blurring operation of the video image of the first user performed by the server. Examples include the foregoing implementations such as extracting some primitive pixels or using filter function(s).

In addition, the effect of partial blurring may also be implemented if the video image of the first user is operated by a user in the process of blurred video communication. In a specific implementation, if the first user performs an operation on the video image of the first user, a process performed by the server may include the following:

1) receiving a notification from the client of the first user, where the notification is used for indicating that the first user has performed an operation on the video image of the first user and the notification may include information of an operation region of the first user;

2) when receiving the video image of the first user afterward, performing the blurring operation only on a portion of the video image that is outside the operation region, sending a processed video image of the first user to the client of the second user to facilitate the client of the second user to display a partially blurred video image of the first user in the video dialog window.

If the second user performs an operation on the video image of the first user, the first user may be asked whether to allow a display of his/her video image that is partially clear to the second user first. Therefore, for the server, the following method blocks may be included:

1) receiving a notification from the client of the second user, where the notification is used for indicating that the second user has performed an operation on the video image of the first user and the notification may further include information of an operation region of the second user;

2) sending the information of the operation region to the client of the first user, such that the client of the first user sends a query to the first user to inquire whether the first user allows a display of a portion of the video image that is within the scope of the operation region performed by the second user to the second user;

2) after receiving a response message from the client of the first user and if information included in the response message indicates an approval, performing a partial blurring operation only on a portion of the video image that is outside the operation region after receiving the video image of the first user, and sending a processed video image of the first user to the client of the second user to facilitate the client of the second user to display a partially blurred video image of the first user in the video dialog window.

In the fourth embodiment, the server may store the information of the operation region performed by the first user. In this way, next time when the first user and the second user conduct blurred video communication with each other, the server may first query information of that operation region, perform a partial blurring operation only on a portion of the video image of the first user that is outside the operation region, which is then sent to the client of the second user and is displayed by the client of the second user in the video dialog window.

Fifth Embodiment

Figure 4:
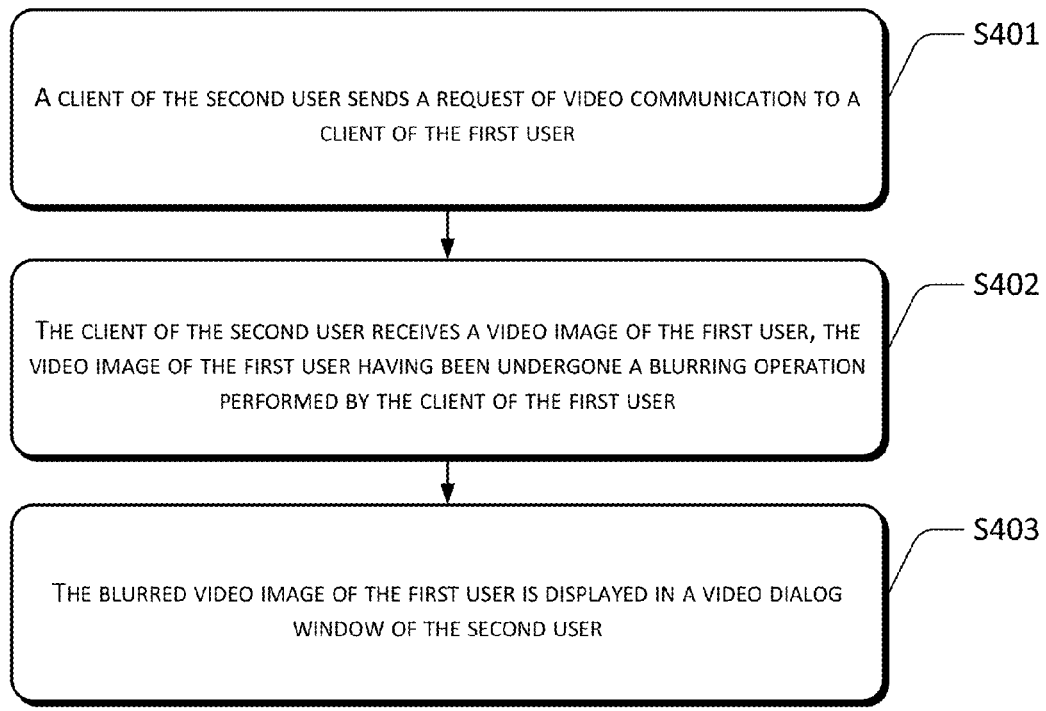
FIG. 4 is a flow chart illustrating another method in accordance with an embodiment of the present disclosure.

The fifth embodiment of the present disclosure provides a method of video communication in an instant communication process. The method is used for performing video communication between a first user and a second user. Referring to FIG. 4, the method may include the following method blocks:

S401: A client of the second user sends a request of video communication to a client of the first user.

In this block, the second user actively sends a request of video communication to the first user. Specifically, the second user may send the request of video communication via a client of the second user to a client of the first user.

S402: The client of the second user receives a video image of the first user, the video image of the first user having undergone a blurring operation performed by the client of the first user.

in this block, the client of the second user receives the video image of the first user. After receiving the request of video communication, the client of the first user may follow the procedure of determination in the second embodiment (specific condition(s) of determination may be designed or chosen in accordance with the user' need and the design of the instant communication system). When the condition(s) of determination is/are satisfied, the client of the first user performs a blurring operation on the video image of the first user, and then sends the blurred video image to the client of the second user. As such, the client of the second user receives the video image of the first user which has been undergone the blurring operation.

S403: The blurred video image of the first user is displayed in a video dialog window of the second user.

Furthermore, when the first user and the second user conduct video communication with each other, the process may further include:

Block A1 determines a region of operation corresponding to operation information in response to detecting that an operation is performed on the video image of the first user.

If the second user desires to see a larger portion of the video image of the first user, the second user may perform an operation on the video image of the first user that is displayed in the video dialog window of the second user so as to determine corresponding information associated with the region of operation. The method of determining the region of operation may employ the method of determination as described in the first to fourth, and is not redundantly repeated herein.

Block A2 sends a query message including the information associated with the region of operation to the first user. The query message is used for inquiring the first user whether to allow performing a blurring operation only on a portion of the video image that is outside the region of operation.

Upon determining the region of operation, the client of the second user may send a query message including the information associated with the region of operation to the client of first user to inquire the first user whether to allow performing the blurring operation only on a portion of the video image that is outside the region of operation. The first user may choose to agree or disagree according to a chatting status after receiving the query message.

Moreover, when the first user allows performing the blurring operation only on the portion of the video image that is outside the region of operation, the video image of the first user received by the second user is a video image having the blurring operation performed only in a video image area that is outside the region of operation.

Specifically, in response to receiving a response that allows the blurring operation to be performed only in for a portion of the video image that is outside the region of operation from the first user, the client of the first user performs the blurring operation on the portion of the video image of the first user that is outside the region of operation, and sends a processed video image to the client of the second user. The video image of the first user that is received by the client of the second user is a video image which has been blurred in a video image area that is outside the region of operation. The video dialog window of the second user displays the video image of the first user which has been blurred in the video image area that is outside the region of operation.

In short, using the embodiments of the present disclosure, a blurring operation may be performed for video images of both communicating parties in a process of video communication between two users. In this way, convenient online communication may be achieved via video communication while ensuring that respective privacies of the users are not overly exposed.

In addition, when a user intends to add the other party as a buddy, he/she may perform an operation on a blurred video image. Correspondingly, if the operation satisfies predefined criteria, a friend relationship between the two parties may be set up, thus reducing an operation path of the user to add the other party as a buddy and enhancing the efficiency thereof.

Figure 5:
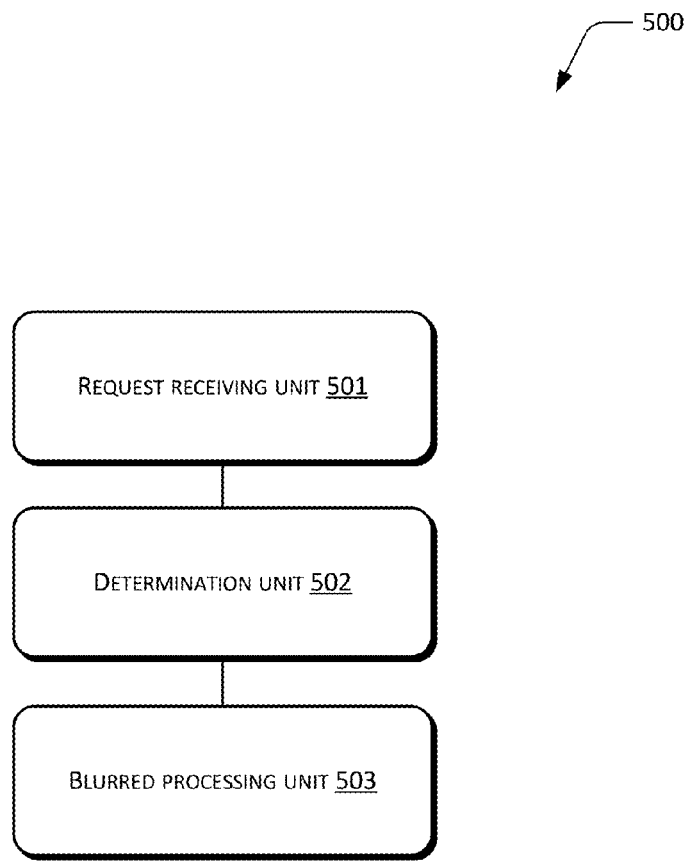
FIG. 5 is a schematic diagram illustrating a system in accordance with an embodiment of the present disclosure.

Corresponding to the methods of video communication in the instant communication process provided in the embodiments of the present disclosure, the embodiments of the present disclosure further provides a system of video communication in an instant communication process, which is used for performing video communication between a first user and a second user. Referring to FIG. 5, the system may include:

a request receiving unit 501 used for receiving a request for video communication;

a determination unit 502 used for determining whether to perform a blurred processing on a video image of the first user; and a blurred processing unit 503 used for performing the blurred processing on the video image of the first user when a determination result of the determination unit 502 is affirmative, such that a blurred video image of the first user is displayed on a video dialog window of the second user.

In a specific implementation, the system may further include:

a detection unit, used for determining a region of operation corresponding to operation information in response to detecting an operation on the video image of the first user; and a partial blurring unit, used for performing the blurring operation only in a video image area outside the region operation for an obtained video image of the first user.

If an operation performed by the first user on the video image of the first user is detected, the partial blurring unit directly performs the blurring portion on the video image area of the first user that is outside the region of operation.

If an operation performed by the first user on the video image of the first user is detected, the partial blurring unit may include:

a query subunit, used for sending a query message to the first user, the query message being used for inquiring the first user whether to allow the blurring operation to be performed only on the video image area that is outside the region of operation; and a processing subunit, used for perform the blurring operation only on the video image area that is outside the region of operation in response to receiving a responses indicating an approval.

In addition, the system may further include:

an information storage unit, used for storing information associated with the region of operation;

a query unit, used for querying whether the information associated with the region of operation for the first user is stored if the blurring operation is to be performed for the video image of the first user when a new request for video communication is received; and a processing unit, used for performing the blurring operation only on the video image area that is outside the region of operation if the information associated with the region of operation for the first user is stored.

In a specific implementation, after performing the blurring operation on the video image of the first user, the client of the first user sends the processed video image to the client the second user, such that the video dialog window of the second user displays the blurred video image of the first user.

Alternatively, in another specific implementation, the client of the first user sends the obtained video image of the first user to the client of the second user, such that the video dialog window displays the blurred video image of the first user after the client of the second user performs the blurring operation on the video image of the first user.

In a specific implementation, the determination unit 502 may be used for:

determining whether the blurring operation is needed to be performed for the video image of the first user based on one or more of the following criteria:

whether the second user is included in a first contact list;

whether the first user and the second user conduct the video communication with each other for a first time; and whether the request for video communication includes an indicator that instructs the blurring operation to be performed for the video image of the first user.

Figure 6:
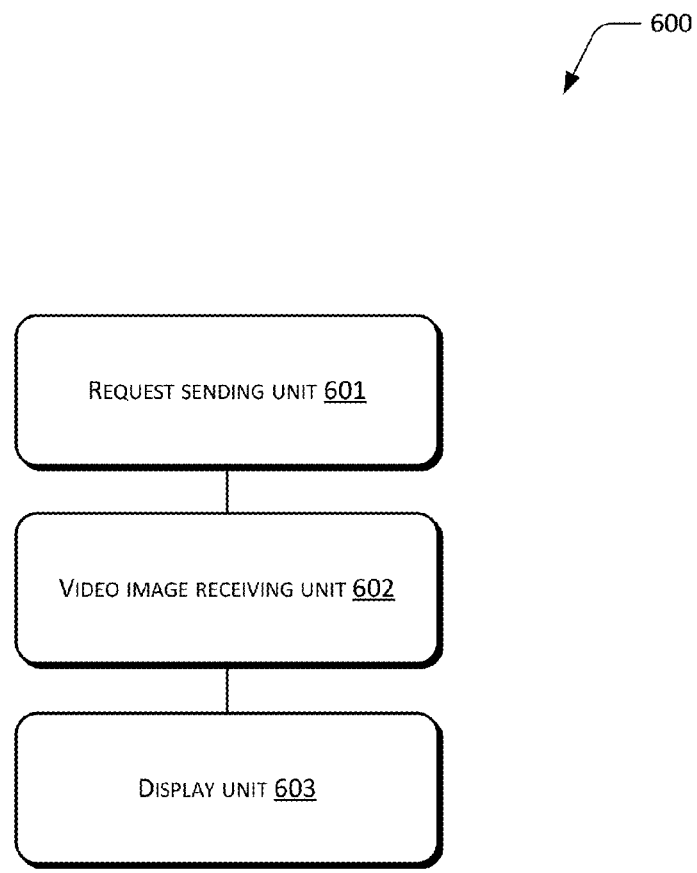
FIG. 6 is a schematic diagram illustrating another system in accordance with an embodiment of the present disclosure.

In correspondence with the fifth embodiment, the embodiments of the present disclosure further provide a system of video communication in an instant communication process, which is used for performing video communication between a first user and a second user. Referring to FIG. 6, the system may include:

a request sending unit 601 used for sending a request for video communication to a client of the first user from a client of the second user;

a video image receiving unit 602 used for receiving a video image of the first user by the client of the second user, the video image of the first user having been undergoing a blurred processing by the client of the first user; and a display unit 603 used for displaying a blurred video image of the first user in a video dialog window of the second user.

Moreover, the system may further include:

a detection unit, used for determining a region of operation corresponding to operation information in response to detecting an operation on the video image of the first user; and a query unit, used for sending a query message including information of the region of operation to the first user, the query message being used for inquiring the first user whether to allow the blurring operation to be performed only on an video image area that is outside the region of operation.

When the first user allows the blurring operation to be performed only on the video image area that is outside the region of operation, the video image of the first user received by the video image receiving unit is a video image having the blurring operation performed only on the video image area that is outside the region of operation.

In short, using the embodiments of the present disclosure, a blurring operation may be performed for video images of both communicating parties in a process of video communication between two users. In this way, convenient online communication may be achieved via video communication while ensuring that respective privacies of the users are not overly exposed.

In addition, when a user intend to add the other party as a buddy, he/she may perform an operation on a blurred video image. Correspondingly, if the operation satisfies predefined criteria, a friend relationship between the two parties may be set up, thus reducing an operation path of the user to add the other party as a buddy and enhancing the efficiency thereof.

From the foregoing implementations, one skilled in the art may clearly know that the present disclosure can be implemented in terms of software and necessary general hardware platform. Based on this understanding, the technical solutions of the present disclosure in essence or the part of contribution to the existing technologies may be embodied in a form of a software product. The software product may be stored in storage media, such as ROM/RAM, a magnetic disk, an optical disk, etc., including multiple instructions to direct a computing device (a personal computer, a server or a network device, etc.) to perform the embodiments of the present disclosure or the methods described in certain parts of the embodiments.

Figure 7:
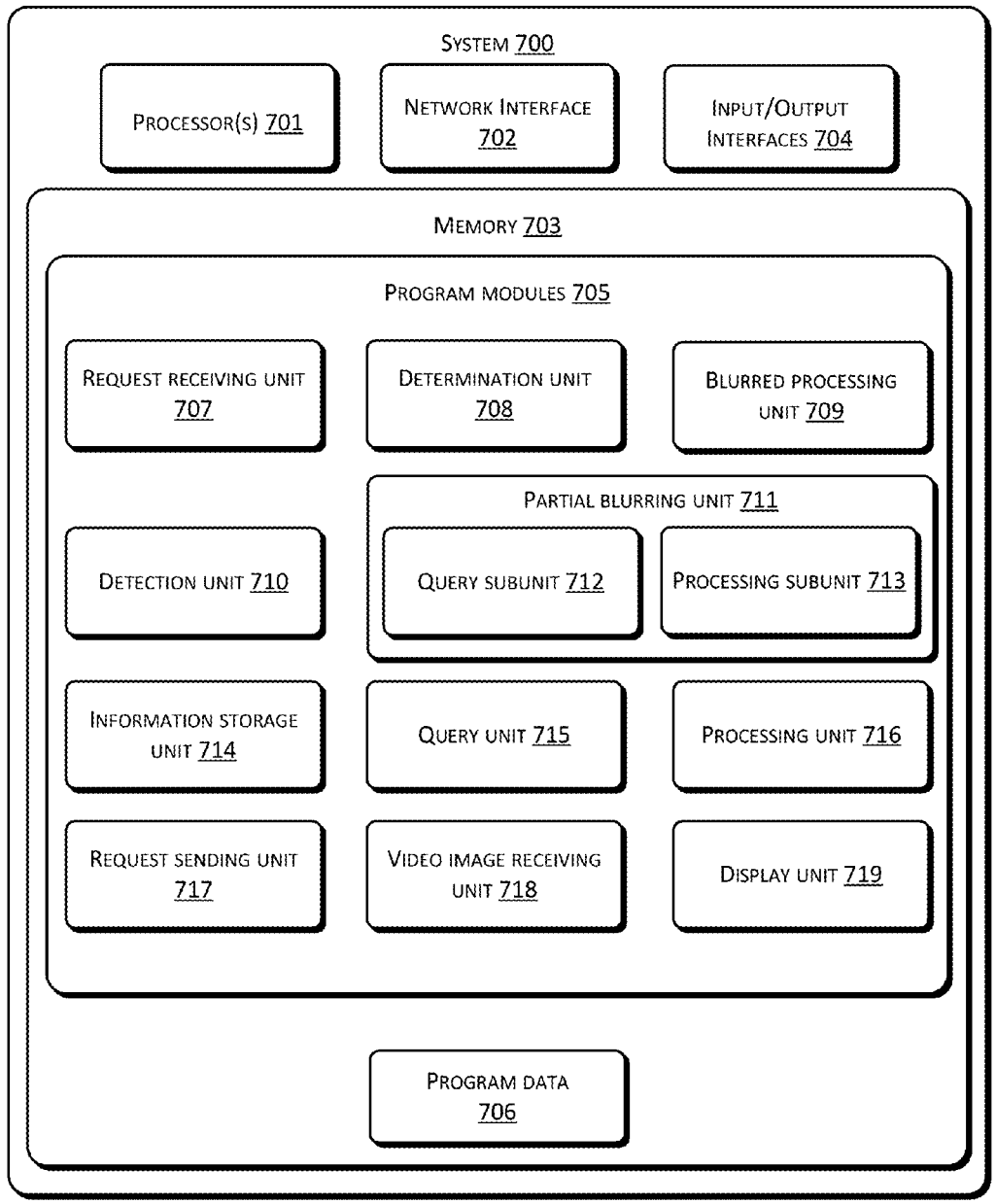
FIG. 7 is a structural diagram illustrating the system as described in FIGS. 5 and 6.

For example, FIG. 7 shows an example system 700, such as the system as described above, in more detail. As described in the foregoing embodiments, system 700 may be located in a client of a user (such as a first user or a second user) or a server. In an embodiment, the system 700 may be distributed among clients of communicating users involved in video communication and/or a server. In an embodiment, the system 700 may include, but is not limited to, one or more processors 701, a network interface 702, memory 703 and an input/output interface 704.

The memory 703 may include a form of computer readable media such as a volatile memory, a random access memory (RAM) and/or a non-volatile memory, for example, a read-only memory (ROM) or a flash RAM. The memory 703 is an example of a computer readable media.

The computer readable media may include a volatile or non-volatile type, a removable or non-removable media, which may achieve storage of information using any method or technology. The information may include a computer-readable command, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

The memory 703 may include program modules 705 and program data 706. In an embodiment, the program units 705 may include a request receiving unit 707, a determination unit 708, a blurred processing unit 709, a detection unit 710, a partial blurring unit 711 (which may include a query subunit 712 and/or a processing subunit 713), an information storage unit 714, a query unit 715, a processing unit 716, a request sending unit 717, a video image receiving unit 718 and/or a display unit 719. Details of these units and subunits may be found in the foregoing description and are therefore not redundantly described herein.

The embodiments of the present disclosure are described in a progressive manner, and the same or similar parts in different embodiments can be referenced with one another. Portions emphasized in each embodiment are different from other embodiments. Particularly, the description of the systems or the system embodiments is relatively simple because they are basically similar to the method embodiments, and related portions can be referenced to respective descriptions of the method embodiments. The foregoing systems and system embodiments are merely schematic. The units described herein as separate components may or may not be physically separate. And the unit serving as a displayed component may or may not be a physical unit, i.e., can be located at a single location or distributed among a plurality of network elements. All or parts of the modules may be selected according to actual needs for achieving an objective of the solution of the embodiment. One of ordinary skill in the art may comprehend and implement the embodiments without making any creative effort.

Detailed descriptions of the video communication methods and systems in an instant communication process provided by the present disclosure have been described in detail above. The specification explains the principles and implementations of the present disclosure using specific embodiments. The foregoing embodiments are merely used for helping to understand the methods and core concepts of the present disclosure. Also, based on the concepts of the present disclosure, one of ordinary skill in the art may change specific implementations and scope of applications. In short, the present specification shall be not construed as limitations to the present disclosure.

What is claimed is:

1. A method implemented by one or more computing devices, the method comprising:
   receiving a request for video communication;
   detecting a first operation on a video image of a first user for performing a blurring operation, the first operation including a selection of a first region of operation which area is less than an entire area of the video image;
   determining the first region of operation corresponding to the detected first operation; and
   performing the blurring operation on a portion of the video image of the first user that is outside the first region of operation, the blurring operation enabling a video dialog window of a second user to display a partially blurred video image of the first user.

2. The method of claim 1, further comprising storing information associated with the first region of operation of the video image of the first user.

3. The method of claim 2, further comprising:
   receiving a new request for video communication between the first user and the second user; and
   performing the blurred operation on the video image in accordance with the stored information associated with the first region of operation of the video image of the first user.

4. The method of claim 1, further comprising determining whether to perform the blurring operation on the video image of the first user based at least in part on one or more criteria, prior to performing the blurring operation.

5. The method of claim 4, wherein the one or more criteria comprise:
   whether the second user is included in a contact list of the first user;
   whether the first user and the second user conduct the video communication with each other for a first time; and
   whether the request for video communication includes an indicator that instructs the blurring operation to be performed for the video image of the first user.

6. The method of claim 1, further comprising:
   receiving a notification from a client of the second user, the notification indicating a second operation requested by the second user to be performed the video image of first user and the notification including information associated with a second region of operation;
   receiving an approval from the first user with respect to the notification; and
   performing the second operation on the video image of the first user based at least in part on the second region of operation.

7. The method of claim 6, wherein the second operation comprises enabling a respective portion of the video image of the first user within the second region of operation to be display in the video dialog window of the second user.

8. One or more computer readable media storing executable instructions that, when executed by one or more processors, cause the one or more processors to perform acts comprising:
   receiving a request for video communication;
   detecting a first operation on a video image of a first user for performing a blurring operation;
   determining a first region of operation corresponding to the detected first operation; and
   performing the blurring operation on a portion of the video image of the first user that is outside the first region of operation, the blurring operation enabling a video dialog window of a second user to display a blurred video image of the first user.

9. The one or more computer readable media of claim 8, the acts further comprising storing information associated with the first region of operation of the video image of the first user.

10. The one or more computer readable media of claim 9, the acts further comprising:
  receiving a new request for video communication between the first user and the second user; and
  performing the blurred operation on the video image in accordance with the stored information associated with the first region of operation of the video image of the first user.

11. The one or more computer readable media of claim 8, the acts further comprising determining whether to perform the blurring operation on the video image of the first user based at least in part on one or more criteria, prior to performing the blurring operation.

12. The one or more computer readable media of claim 11, wherein the one or more criteria comprise:
  whether the second user is included in a contact list of the first user;
  whether the first user and the second user conduct the video communication with each other for a first time; and
  whether the request for video communication includes an indicator that instructs the blurring operation to be performed for the video image of the first user.

13. The one or more computer readable media of claim 8, the acts further comprising:
  receiving a notification from a client of the second user, the notification indicating a second operation requested by the second user to be on the video image of first user and the notification including information associated with a second region of operation;
  receiving an approval from the first user with respect to the notification; and
  performing the second operation on the video image of the first user based at least in part on the second region of operation.

14. The one or more computer readable media of claim 13, wherein the second operation comprises enabling a respective portion of the video image of the first user within the second region of operation to be display in the video dialog window of the second user.

15. A system comprising:
  one or more processors;
  memory;
  a request sending unit stored in the memory and executable by the one or more processors to send a request for video communication to a client of a first user;
  a video image receiving unit stored in the memory and executable by the one or more processors to receive a video image of the first user, portions of the video image that are other than a portion corresponding to a first region of operation being blurred, wherein the first region of operation corresponds to a first operation that is detected on the video image of the first user; and
  a display unit stored in the memory and executable by the one or more processors to provide the video image of the first user for display in a video dialog window of a second user.

16. The system of claim 15, further comprising a detection unit to determine a second region of operation in response to detecting a request from the second user to perform a second operation on the video image of first user.

17. The system of claim 15, further comprising a query unit to send a query message including information associated with the second region of operation to the client of the first user, the query message being used for querying the first user whether to allow the second operation to be performed on the video image.

18. The system of claim 17, further comprising a partial blurring unit to perform the second operation on the video image based on to the second region of operation.

19. The system of claim 15, wherein the second operation comprises enabling a respective portion of the video image of the first user within the second region of operation to be display in the video dialog window of the second user.

20. The system of claim 15, further comprising a determination unit to determine whether to perform a blurring operation on the video image of the first user based at least in part on one or more criteria.

* * * * *